United States Patent
Wu et al.

(10) Patent No.: US 9,396,687 B2
(45) Date of Patent: Jul. 19, 2016

(54) METHOD, APPARATUS, AND SYSTEM FOR CONTROLLING THREE DIMENSIONAL DISPLAYS

(71) Applicant: BOE TECHNOLOGY GROUP CO., LTD., Beijing (CN)

(72) Inventors: Yanbing Wu, Beijing (CN); Lilei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 13/966,509

(22) Filed: Aug. 14, 2013

(65) Prior Publication Data

US 2014/0055336 A1 Feb. 27, 2014

(30) Foreign Application Priority Data

Aug. 24, 2012 (CN) .......................... 2012 1 0306526

(51) Int. Cl.
*G09G 3/36* (2006.01)
*G09G 5/10* (2006.01)
*H04N 13/04* (2006.01)

(52) U.S. Cl.
CPC .............. *G09G 3/36* (2013.01); *H04N 13/0409* (2013.01); *H04N 13/0497* (2013.01)

(58) Field of Classification Search
CPC ........... G09G 3/003; G09G 2320/0209; G02B 27/2214; G02B 27/26
See application file for complete search history.

(56) References Cited

U.S. PATENT DOCUMENTS

| | | | |
|---|---|---|---|
| 2006/0197462 A1* | 9/2006 | Uchiyama et al. | 315/169.3 |
| 2006/0268104 A1* | 11/2006 | Cowan et al. | 348/42 |
| 2007/0146603 A1* | 6/2007 | Uehara | G02F 1/134363 349/141 |
| 2010/0302351 A1 | 12/2010 | Yanamoto | |
| 2012/0044332 A1* | 2/2012 | Ishida | 348/56 |
| 2012/0307170 A1* | 12/2012 | Inoue et al. | 349/37 |

FOREIGN PATENT DOCUMENTS

CN 101900886 A 12/2010
WO 2012/053425 A1 4/2012

OTHER PUBLICATIONS

Second Chine Office Action Appln. No. 201210306526.3; Issued Aug. 20, 2014.

(Continued)

*Primary Examiner* — Alexander Eisen
*Assistant Examiner* — Nan-Ying Yang
(74) *Attorney, Agent, or Firm* — Ladas & Parry LLP

(57) ABSTRACT

Method, apparatus, and system for controlling three dimensional displays are provided. The method comprises: acquiring a current time when a liquid crystal raster device is driven by a AC driving voltage signal; shutting down a backlight source when the current time is within a setting period of time included in an input period of the AC driving voltage signal, wherein the setting period of time refers to a period during which a polarity of the AC driving voltage signal changes such that an image crosstalk is generated when the backlight source is in a normal-open state. Since the backlight source is shut down and stops providing backlight to the panel when the current time is within the setting period, the panel displays black thereby left eye and right eye images are prevented from entering into error regions of view, the image crosstalk is reduced and a display quality is improved.

10 Claims, 3 Drawing Sheets

(56) References Cited

OTHER PUBLICATIONS

Extended European Search Report Issued Nov. 14, 2013 EP 13 18 1565.

First Chinese Office Action Dated Mar. 27, 2014 Appln. No. 201210306526.3.
Chinese Rejection Decision dated Feb. 25, 2015; Appln. No. 201210306526.3.
EPO Office Action dated Nov. 17, 2015; Appln. No. 13 181 565.6.

* cited by examiner

METHOD, APPARATUS, AND SYSTEM FOR CONTROLLING THREE DIMENSIONAL DISPLAYS

TECHNICAL FIELD

The present invention relates to a field of three dimensional display technologies, and particularly, to a method, apparatus, and system for controlling three dimensional displays.

BACKGROUND

With a development in science and technology, a three dimensional stereoscopic display, especially a naked eye three dimensional stereoscopic display, has become one of the inexorable trends in the display field. As illustrated in FIG. 1, a naked eye three dimensional display device comprises: a backlight source 1, a display panel 2 and a liquid crystal raster device 3; wherein the display panel 2 comprises left eye sub-pixels for providing a left eye image and right eye sub-pixels for providing a right eye image; the liquid crystal raster device 3 is an optical device capable of presenting a light shielded area 3a and a light transmitted area 3b arranged periodically and alternatively; and the basic principle thereof is as follows: the backlight source 1 provides the display panel 2 with backlight, lights emitted from the left eye sub-pixels and the right eye sub-pixels of the display panel 2 are incident on different fields of view through the light transmitted area 3b of the liquid crystal raster device 3, and the left and right eyes of a viewer also fall on the different fields of view, thereby a three dimensional perception is produced.

As illustrated in FIG. 2, the prior art generally drives the liquid crystal raster device by an alternating current square wave voltage, and the driving electric field 5 formed in the liquid crystal raster device changes with an alternating current driving voltage signal 6. When the alternating current driving voltage signal 6 changes to a negative direction from a positive direction, the driving electric field 5 within the liquid crystal raster device also changes to a negative value from a positive value along with the change in the alternating current driving voltage signal 6 (it will be similar when the alternating current driving voltage signal 6 changes to the positive direction from the negative direction). At this time, electrons in liquid crystal molecules are rearranged and the liquid crystal molecules deflect, such that a brightness of the light shielded area in the liquid crystal raster device decreases, a transmittance rises, and a light leaking phenomenon may occur.

The light shielded area shields lights emitted from the right eye sub-pixel for the left eye of the viewer, and shields lights emitted from the left eye sub-pixel for the right eye of the viewer. When the transmittance of the light shielded area in the liquid crystal raster device rises to a certain threshold and the light leaking occurs, the left eye of the viewer would view inevitably the lights emitted from the right eye sub-pixel and the right eye of the viewer inevitably would view the lights emitted from the left eye sub-pixel, that is, an image crosstalk occurs.

SUMMARY

The present disclosure provides a method, apparatus and system for controlling three dimensional displays to reduce the image crosstalk existing in the prior art.

The method for controlling three dimensional displays according to the embodiments of the present invention, comprises:

acquiring a current time when a liquid crystal raster device is driven by an alternating current driving voltage signal;

shutting down a backlight source when the current time is within a setting period of time included in an input period of the alternating current driving voltage signal, wherein the setting period of time refers to a period of time during which a polarity of the alternating current driving voltage signal changes such that an image crosstalk is generated when the backlight source is in a normal-open state.

An apparatus for controlling three dimensional displays according to the embodiments of the present invention comprises:

an acquisition unit for acquiring a current time when a liquid crystal raster device is driven by an alternating current driving voltage signal;

a shutting-down unit for shutting down a backlight source when the current time is within a setting period of time included in an input period of the alternating current driving voltage signal, wherein the setting period of time refers to a period of time during which a polarity of the alternating current driving voltage signal changes such that an image crosstalk is generated when the backlight source is in a normal-open state.

A system for controlling three dimensional displays according to the embodiments of the present invention comprises:

a display panel;

a backlight source located on a light incident side of the display panel;

a liquid crystal raster device located on a light outgoing side of the display panel or between the backlight source and the display panel;

a control module, connected with the backlight source, the liquid crystal raster device and the display panel, respectively, for acquiring a current time when a liquid crystal raster device is driven by an alternating current driving voltage signal and shutting down a backlight source when the current time is within a setting period of time included in an input period of the alternating current driving voltage signal, wherein the setting period of time refers to a period of time during which a polarity of the alternating current driving voltage signal changes such that an image crosstalk is generated when the backlight source is in a normal-open state.

In the solution according to the embodiments of the present invention, since the backlight source is shut down and stops providing backlight to the display panel when the current time is within the setting period of time, the display panel displays black, so that a left eye image and a right eye image are prevented from entering into error regions of view, the image crosstalk is reduced and a display quality is improved.

REFERENCE NUMERALS IN THE FIGURES

1—backlight source; 2—display panel; 3—liquid crystal raster device; 3a—light shielded area; 3b—light transmitted area; 4—transmittance of the light shielded area; 5—driving electronic field; 6—alternating current driving voltage signal; 7—transmittance threshold; 8—scan signal; 9—control module; 10—acquisition unit; 11—shutting-down unit

DETAILED DESCRIPTION

In order to reduce the image crosstalk existing in the prior art, the embodiments of the present invention provide a method, apparatus and system for controlling three dimensional displays.

A method for controlling three dimensional displays according to the embodiments of the present invention, comprises:

acquiring a current time at which a liquid crystal raster device is driven by an alternating current driving voltage signal;

shutting down a backlight source when the current time is within a setting period of time included in an input period of the alternating current driving voltage signal, wherein the setting period of time refers to a period of time during which a polarity of the alternating current driving voltage signal changes such that an image crosstalk is generated when the backlight source is in a normally-open state.

Figure 1:
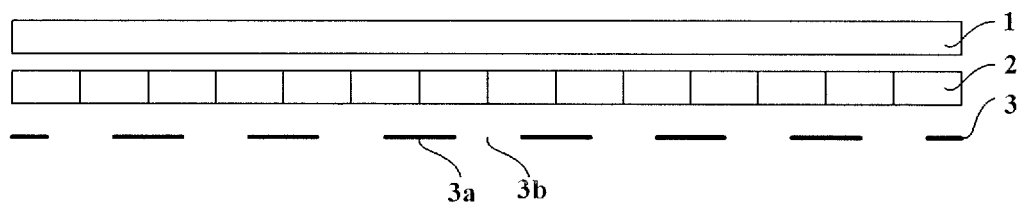
FIG. 1 is a schematic view illustrating a structure of a three dimensional display device.
Figure 2:
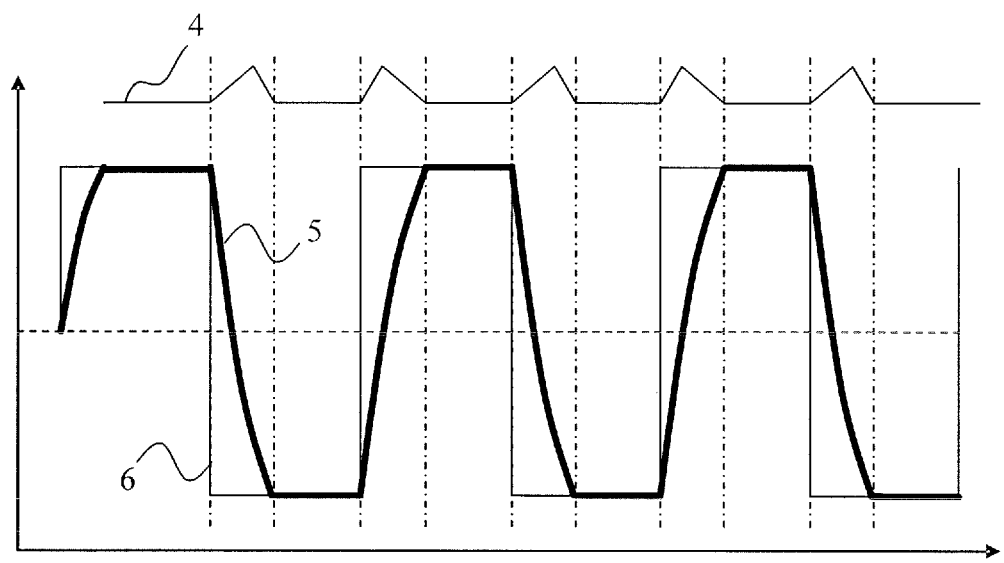
FIG. 2 is a graph of relationship among a brightness of the light shielded area, a driving electronic field and an alternating current driving voltage signal of the three dimensional display device.
Figure 3:
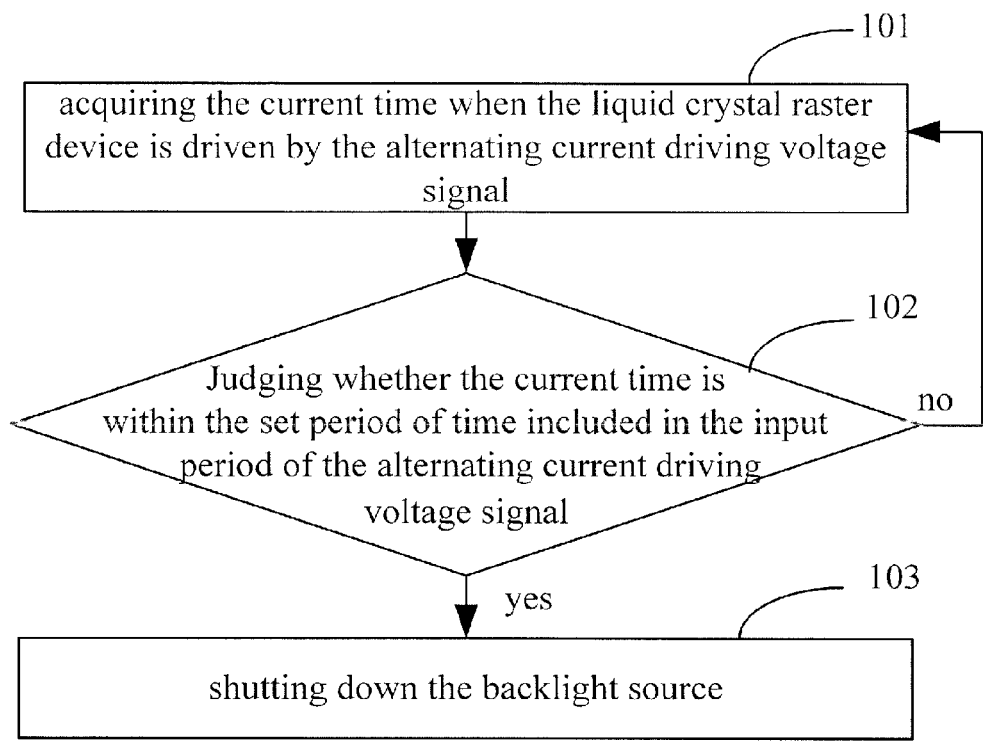
FIG. 3 is a schematic flowchart illustrating a method for controlling three dimensional displays according to the embodiments of the present invention.

As illustrated in FIG. 3, a specific flow of the method for controlling three dimensional displays according to the embodiments of the present invention is as follows:

Step 101, acquiring the current time at which the liquid crystal raster device is driven by the alternating current driving voltage signal;

Step 102, judging whether the current time is within the setting period of time included in the input period of the alternating current driving voltage signal, and if so, a step 103 is performed, otherwise, the process returns to the Step 101;

Step 103, shutting down the backlight source.

Figure 4:
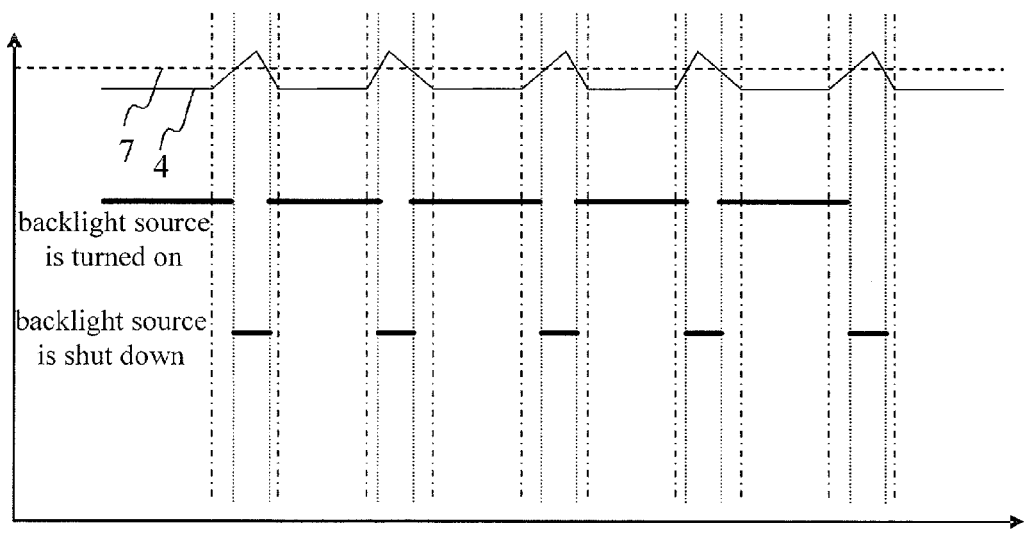
FIG. 4 is a schematic view illustrating a principle of one implementation of the method for controlling three dimensional displays according to the embodiments of the present invention.

Reasons for driving the liquid crystal raster device by adopting the alternating current driving voltage signal are: the liquid crystal molecules would be polarized if the polarity of the driving voltage remains unchanged, and the liquid crystal molecule needs a long time to restore to an original state when the driving voltage is withdrawn, while the polarity of the driving voltage changes in a certain frequency when the alternating current driving voltage signal is adopted, so that the liquid crystal molecule may restore to its original state in a short time, but it may be easy to cause an increase in a transmittance 4 of the light shielded area and generate the image crosstalk. As illustrated in FIG. 4, the setting period of time in the embodiment of the present invention is the period of time during which the image crosstalk is generated in the prior art. The setting period of time may be derived from a transmittance threshold 7 or a brightness threshold of the light shielded area in the liquid crystal raster device, wherein the transmittance threshold 7 is a critical value of the transmittance of the light shielded area, which results in the image crosstalk, and the brightness threshold is a critical value of a brightness of the light shielded area, which results in the image crosstalk. The transmittance threshold and the brightness threshold may be determined in accordance with professional experiences or professional standards, for example, according to the professional experiences, human eyes may perceive the image crosstalk obviously when the transmittance is above a certain value, and this value may be defined as the transmittance threshold. In particular, the transmittance threshold or the brightness threshold may be determined firstly in accordance with the professional experiences and the professional standards, and then the setting period of time may be derived from the transmittance threshold or the brightness threshold.

In the embodiments of the present invention, since the backlight source is shut down and stops providing backlight to the display panel when the current time is within the setting period of time, the display on the display panel is black, so that the left eye image and the right eye image are prevented from entering into error regions of view, the image crosstalk is reduced and a display quality is improved.

A frequency of the alternating current driving voltage signal is preferably smaller than a setting frequency threshold, because in each period of the alternating current driving voltage signal, the backlight source would be shut down every time when the current time is within the set period of time, and decreasing of the frequency of the alternating current driving voltage signal facilitates to reduce a frequency at which the backlight source is shut down and in turn decrease a time proportion of shutting down the backlight source, so that an influence on the entire display brightness of the three dimensional display device by the method according to the embodiments of the present invention can be decreased to a lower level. The setting frequency threshold is derived by testing or calculating according to requirements for the entire display brightness of the three dimensional display apparatus. The smaller the frequency of the alternating current driving voltage signal is, the better it is theoretically, but it is also needed to consider a requirement for a restore time of the liquid crystal molecule, when the frequency of the alternating current driving voltage signal is smaller than the setting frequency threshold.

In the method according to the embodiments of the present invention, the setting period of time is within a period of time during which one row of sub-pixels (when the display panel is in a row scanning mode) or one column of sub-pixels (when the display panel is in a column scanning mode) in the display panel are scanned. That is to say, the time when the backlight source is shut down coincides with the time when one row or one column of sub-pixels are scanned and charged, which facilitates to further reduce the image crosstalk and improve the display quality.

Figure 5:
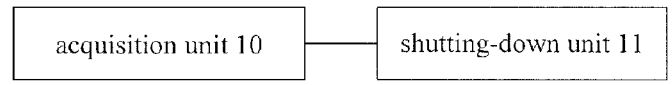
FIG. 5 is a schematic view illustrating a structure of an apparatus for controlling three dimensional displays according to the embodiments of the present invention.

As illustrated in FIG. 5, an apparatus for controlling three dimensional display according to the embodiments of the present invention, comprises:

an acquisition unit 10 for acquiring a current time at which a liquid crystal raster device is driven by an alternating current driving voltage signal;

a shutting-down unit 11 for shutting down a backlight source when the current time is within a setting period of time included in an input period of the alternating current driving voltage signal, wherein the setting period of time refers to the period of time when a polarity of the alternating current driving voltage signal changes such that an image crosstalk is generated when the backlight source is in a normally-open state.

The setting period of time is derived from the transmittance threshold or the brightness threshold of the light shielded area in the liquid crystal raster device, wherein the transmittance threshold is the critical value of the transmittance leading to the image crosstalk, and the brightness threshold is the critical value of the brightness leading to the image crosstalk.

The frequency of the alternating current driving voltage signal is smaller than a setting frequency threshold.

The setting period of time is within the period of time when one row of sub-pixels or one column of sub-pixels in the display panel are scanned.

Figure 6:
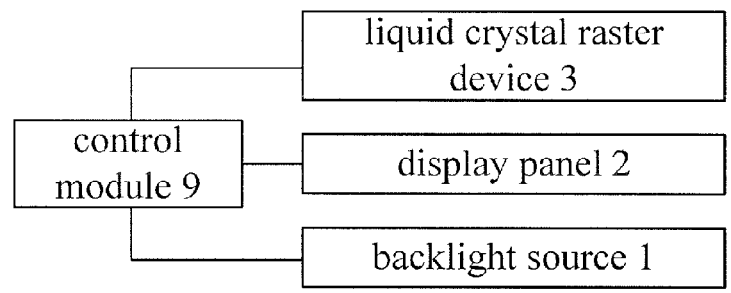
FIG. 6 is a schematic view illustrating a structure of a system for controlling three dimensional displays according to the embodiments of the present invention.

As illustrated in FIG. 6, a system for controlling three dimensional displays according to the embodiments of the present invention, comprises:

a display panel 2;

a backlight source 1 located on a light incident side of the display panel 2;

a liquid crystal raster device 3 located on a light outgoing side of the display panel 2 or between the backlight source and the display panel;

a control module 9, connected with the backlight source 1, the liquid crystal raster device 3 and the display panel 2, respectively, for acquiring a current time when the liquid crystal raster device is driven by an alternating current driving voltage signal, and shutting down a backlight source when the current time is within a setting period of time included in an input period of the alternating current driving voltage signal, wherein the setting period of time refers to a period of time during which the polarity of the alternating current driving voltage signal changes when the backlight source is in a normal-open state such that an image crosstalk is generated.

The liquid crystal raster device may be a liquid crystal parallax barrier, and is preferably implemented by using a liquid crystal shutter slit raster device in the embodiments of the present invention. The liquid crystal shutter slit raster device is a TN (Twisted Nematic) mode of liquid crystal display panel, it is light transmitted entirely when no power is supplied, so that the display device may perform a conventional two dimensional display; and it becomes a slit raster spaced by black and white stripes (the black stripe is the light shielded area, and the area between the adjacent black stripes is the light transmitted area of the white strip) when the power is supplied. At this time, the display device may perform the three dimensional display.

Figure 7:
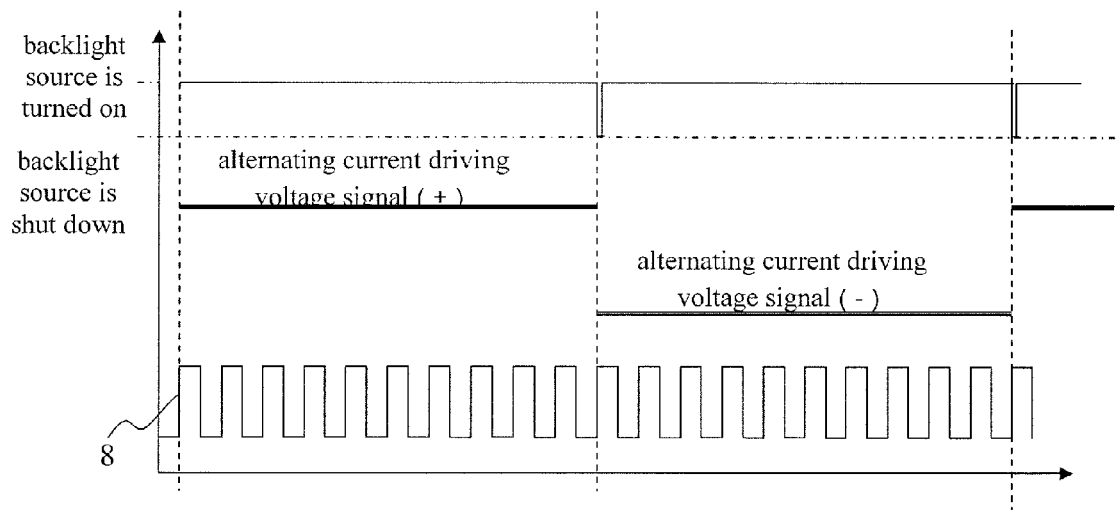
FIG. 7 is a schematic view illustrating the controlling principle of one implementation of the three dimensional display controlling system according to the embodiments of the present invention.

In connection with FIG. 7, a controlling process of one specific embodiment of the system for controlling three dimensional displays according to the embodiments of the present invention is as follows.

The control module receives a scan signal 8 of the display panel, assuming that the frequency of the scan signal 8 is 100 Hz, that is, the image of the display panel is scanned once every 1/100 second.

An optimal value of the frequency of the alternating current driving voltage signal for driving the liquid crystal raster device is determined according to tests, assuming that the frequency is 5 Hz, that is, the alternating current driving voltage signal makes a positive-negative change every 1/10 seconds.

When the control module receives the first scan signal, the alternating current driving voltage signal starts to drive the liquid crystal raster device, at the same time the backlight source is turned on and the display panel starts to scan.

When the control module receives the eleventh scan signal, the alternating current driving voltage signal changes to a negative direction voltage, at this time, the transmittance of the light shielded area in the liquid crystal raster device may increase and be greater than the threshold of the setting transmittance within a period of time t, and thus the backlight source is shut down during the period of time t and turned on after the period of time t lapses.

Similarly, when the control module receives the twenty-first scan signal, the backlight source is shut down during the period of time t and is turned on after the period of time t lapses.

Obviously, those skilled in the art can make various variations and modifications to the present invention without departing from the spirit and scope of the present invention. As such, the present invention is intended to include these variations and modifications if these variations and modifications fall into the scope of the claims and their equivalent technologies of the present invention.

What is claimed is:

1. A method for controlling three dimensional displays, comprising:

acquiring a current time when a liquid crystal raster device is driven to shield light by an alternating current driving voltage signal;

shutting down a backlight source when the current time is within a setting period of time included in an input period of the alternating current driving voltage signal, wherein the setting period of time refers to a period of time during which a polarity of the alternating current driving voltage signal changes from positive polarity to negative polarity or from negative polarity to positive polarity such that an image crosstalk is generated when the backlight source is in a normal-open state, wherein the transmittance of the liquid crystal raster device when the alternating current driving voltage signal maintains its polarity is lower than the transmittance of the liquid crystal raster device when the polarity of the alternating current driving voltage signal changes from positive polarity to negative polarity or from negative polarity to positive polarity, wherein the image crosstalk occurs as a left eye of a viewer views lights emitted from a right eye sub-pixel and a right eye of the viewer views lights emitted from a left eye sub-pixel as the transmittance of the liquid crystal raster device rises when the polarity of the alternating current driving voltage signal changes from positive polarity to negative polarity or from negative polarity to positive polarity.

2. The method of claim 1, wherein the setting period of time is obtained from a transmittance threshold or a brightness threshold of a light shielded area in the liquid crystal raster device, the transmittance threshold is a critical value which results in an image crosstalk, and the brightness threshold is a critical value which results in the image crosstalk.

3. The method of claim 1, wherein the frequency of the alternating current driving voltage signal is smaller than a setting frequency threshold.

4. The method of claim 1, wherein the setting period of time is within a period of time during which one row of sub-pixels or one column of sub-pixels in the display panel is scanned.

5. An apparatus for controlling three dimensional displays, comprising:

an acquisition unit for acquiring a current time when a liquid crystal raster device is driven to shield light by an alternating current driving voltage signal;

a shutting-down unit for shutting down a backlight source when the current time is within a setting period of time included in an input period of the alternating current driving voltage signal, wherein the setting period of time refers to a period of time during which a polarity of the alternating current driving voltage signal changes from positive polarity to negative polarity or from negative polarity to positive polarity such that an image crosstalk is generated when the backlight source is in a normal-open state, wherein the transmittance of the liquid crystal raster device when the alternating current driving voltage signal maintains its polarity is lower than the transmittance of the liquid crystal raster device when the polarity of the alternating current driving voltage signal changes from positive polarity to negative polarity or from negative polarity to positive polarity, wherein the image crosstalk occurs as a left eye of a viewer views lights emitted from a right eye sub-pixel and a right eye of the viewer views lights emitted from a left eye sub-pixel as the transmittance of the liquid crystal raster device rises when the polarity of the alternating current driving voltage signal changes from positive polarity to negative polarity or from negative polarity to positive polarity.

6. The apparatus of claim 5, wherein the setting period of time is obtained from a transmittance threshold or a brightness threshold of a light shielded area in the liquid crystal raster device, the transmittance threshold is a critical value which results in an image crosstalk, and the brightness threshold is a critical value which results in the image crosstalk.

7. The apparatus of claim 5, wherein the frequency of the alternating current driving voltage signal is smaller than a setting frequency threshold.

8. The apparatus of claim 5, wherein the set period of time is within a period of time during which one row of sub-pixels or one column of sub-pixels in the display panel is scanned.

9. A system for controlling three dimensional displays, comprising:
   a display panel;
   a backlight source located on a light incident side of the display panel;
   a liquid crystal raster device located on a light outgoing side of the display panel or between the backlight source and the display panel;
   a control module, connected with the backlight source, the liquid crystal raster device and the display panel, respectively, for acquiring a current time when the liquid crystal raster device is driven to shield light by an alternating current driving voltage signal and shutting down the backlight source when the current time is within a setting period of time included in an input period of the alternating current driving voltage signal, wherein the setting period of time refers to a period of time during which a polarity of the alternating current driving voltage signal changes from positive polarity to negative polarity or from negative polarity to positive polarity such that an image crosstalk is generated when the backlight source is in a normal-open state, wherein the transmittance of the liquid crystal raster device when the alternating current driving voltage signal maintains its polarity is lower than the transmittance of the liquid crystal raster device when the polarity of the alternating current driving voltage signal changes from positive polarity to negative polarity or from negative polarity to positive polarity,
   wherein the image crosstalk occurs as a left eye of a viewer views lights emitted from a right eye sub-pixel and a right eye of the viewer views lights emitted from a left eye sub-pixel as the transmittance of the liquid crystal raster device rises when the polarity of the alternating current driving voltage signal changes from positive polarity to negative polarity or from negative polarity to positive polarity.

10. The system of claim 9, wherein the liquid crystal raster device is a liquid crystal parallax barrier.

\* \* \* \* \*